United States Patent
Akiyoshi

(10) Patent No.: US 8,730,869 B2
(45) Date of Patent: May 20, 2014

(54) MOBILITY MANAGEMENT SYSTEM, HOME AGENT, MOBILE TERMINAL MANAGEMENT METHOD USED FOR THEM, AND ITS PROGRAM

(75) Inventor: Ippei Akiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 1133 days.

(21) Appl. No.: 12/526,991

(22) PCT Filed: Feb. 13, 2008

(86) PCT No.: PCT/JP2008/052369
§ 371 (c)(1),
(2), (4) Date: Aug. 13, 2009

(87) PCT Pub. No.: WO2008/099857
PCT Pub. Date: Aug. 21, 2008

(65) Prior Publication Data
US 2010/0074179 A1    Mar. 25, 2010

(30) Foreign Application Priority Data
Feb. 13, 2007  (JP) ................................ 2007-031507

(51) Int. Cl.
*H04W 4/00*  (2009.01)
*H04B 7/00*  (2006.01)

(52) U.S. Cl.
USPC .......................... 370/328; 370/329; 370/310

(58) Field of Classification Search
USPC ........................................................ 370/328
See application file for complete search history.

(56) References Cited

U.S. PATENT DOCUMENTS

| 2004/0205211 | A1* | 10/2004 | Takeda et al. ................. | 709/230 |
| 2006/0018273 | A1* | 1/2006 | Yamada et al. ................ | 370/328 |
| 2006/0285520 | A1* | 12/2006 | Venkitaraman ................ | 370/331 |
| 2007/0254661 | A1* | 11/2007 | Chowdhury et al. ......... | 455/436 |
| 2008/0095118 | A1* | 4/2008 | Cakulev et al. ................ | 370/331 |
| 2008/0159227 | A1* | 7/2008 | Ulupinar et al. ............... | 370/331 |
| 2009/0119412 | A1* | 5/2009 | Ala-Vannesluoma et al. ....... | 709/238 |
| 2010/0014465 | A1 | 1/2010 | Tanabe et al. | |

FOREIGN PATENT DOCUMENTS

| JP | 2004274493 A | 9/2004 |
| JP | 2005160053 A | 6/2005 |
| JP | 2008172293 A | 7/2008 |
| WO | 2007051793 A1 | 5/2007 |
| WO | 2007137987 A2 | 12/2007 |

OTHER PUBLICATIONS

International Search Report for PCT/JP2008/052369 mailed May 13, 2008.
S. Gundavelli et al., "Proxy Mobile IPv6", IETF draft-sgundave-mipv6-proxymipv6-01, Jan. 5, 2007.
H. Soliman et al., "Hierarchical Mobile IPv6 mobility management (HMIPv6)", draft-ietf-mobileip-hmipv6, IETF Mobile IP Working Group, Jun. 2003.

(Continued)

*Primary Examiner* — Shripal Khajuria
(74) *Attorney, Agent, or Firm* — Sughrue Mion, PLLC

(57) ABSTRACT

A mobility management system manages mobility of any one mobile terminal with a different mobility protocol depending on an access method. The system comprises an anchor node having a function of managing a CMIP (Client Mobile Internet Protocol) SA (Security Association) and a PMIP (Proxy MIP) SA used to authenticate a location registration message of said mobile terminal.

43 Claims, 8 Drawing Sheets

(56) References Cited

OTHER PUBLICATIONS

Japanese Office Action for JP2008-558105 mailed on Jul. 24, 2012.
Nortel, LG Electronics, "Input to Section 6.5 in TS 23.402: 'Authentication and Security'", S2-070347, 3GPP, Jan. 15-19, 2007. See cited doc. 1 on p. 1 of translated JPOA for explanation of relevance.
Nortel, Marvell, "Input to Section 5.4 in TS23.402: 'Suthentication and Security'", S2-070853, 3GPP, Feb. 12-15, 2007. See cited doc. 2 on p. 1 of translated JPOA for explanation of relevance.
Japanese Office Action for JP Application No. 2012-209586 mailed on Aug. 6, 2013 with Partial English Translation.
Office action in JP patent application 2012-209586, which is a divisional of JP patent application 2008-558105, to which the present application is a US counterpart. Translation provided of substantive portion of action.
L. Wang et al., "A generic packet convergence sublayer (GPCS) for supporting multiple protocols over 802.16 air interface," IEEE 802.16 Broadband Wireless Access Working Group IEEE C802.16g-05/025r2, dated Nov. 11, 2015, cited in JP office action noted above; please see pp. 2 et seq. of the provided file for the actual document, which is in English; concise statement of relevance is provided via the JP office action cited above.

* cited by examiner

MOBILITY MANAGEMENT SYSTEM, HOME AGENT, MOBILE TERMINAL MANAGEMENT METHOD USED FOR THEM, AND ITS PROGRAM

The present application is the National Phase of PCT/JP2008/052369, filed Feb. 13, 2008, which is based upon and claims the benefit of priority from Japanese patent application No. 2007-031507, filed on Feb. 13, 2007, the entire disclosure of which is incorporated herein by reference.

TECHNICAL FIELD

The present invention relates to a mobility management system, a home agent, a mobile terminal management method used for them, and its program. Particularly, it relates to a mobile terminal management method using a home agent.

BACKGROUND ART

Conventionally, a technique called MIP (Mobile Internet Protocol) is used to provide mobile terminals with mobility. In the MIP technique, an anchor router called an HA (Home Agent) manages a correspondence relationship (binding information) between an IP address used by an MN (Mobile Node; mobile terminal) for communication, which will be hereinafter referred to as HoA (Home Address), and an IP address belonging to a network (terminal herein as "visited network") in which the MN exists, which will be hereinafter referred to as CoA (Care-of Address). When the HA receives an IP packet sent to the HoA of a destined MN, the HA encapsulates the IP packet and forwards the encapsulated IP packet to the CoA of the MN. In this way, the MN can receive the packet. Since the HA updates the binding information concerning the MN as the MN moves, the MN registers the location thereof to the HA regularly or every time the MN moves.

However, in recent years, in view of provision of mobility to terminals that do not support MIP or effective utilization of the radio frequency band resources, a technique called PMIP (Proxy MIP) in which the MN function in MIP is switched from a mobile terminal to an access network is being developed (see Non-Patent Document 1, for example).

Mobility management of a mobile terminal according to a conventional MIP, which will be hereinafter referred to as CMIP (Client MIP) to differentiate it from PMIP, will be described with reference to FIG. 8. An HA 12 manages mobility of a mobile terminal 3 using CMIP, irrespective of an access network connected by the mobile terminal 3. In FIG. 8, a mobile network 105 comprises: the HA 12; a AAA server 14; cellular networks 121 and 122; and WiMAX networks 131 and 132. The cellular networks 121 and 122 and the WiMAX networks 131 and 132 comprise routers 251 to 254. In FIG. 8, the mobile terminal 3 captures a CoA having a prefix included in a router advertisement advertised by the router 253 by means of DHCPv6, Stateless Address Auto Configuration, or the like, and the mobile terminal 3 then registers a correspondence relationship between the CoA and the HoA thereof to the HA 12 on its own.

However, in the mobility management based on such conventional CMIP, in view of provision of mobility to terminals that do not support CMIP or effective utilization of the radio frequency band resources, a technique called PMIP in which the MN function in CMIP is switched from a mobile terminal to an access network is being developed.

CMIP and PMIP have advantages and disadvantages regarding function deployment, security model of access network, effective utilization of resources, and the like. Thus, one idea for efficient mobility management is to selectively use two kinds of protocols (CMIP and PMIP) depending on the capability of the access network and manage mobility of each mobile terminal with a single HA. In this case, it is assumed that the HA also has the LMA (Local Mobility Anchor) function, which is the HA for PMIP.

Non-Patent Document 1: S. Gundavelli, et al., "Proxy Mobile IPv6" (IETF.draft-sgundave-mipv6-proxymipv6-01. Jan. 5.2007)

SUMMARY

Disclosure of the above Non-Patent Document 1 is incorporated in its entirety in the present application by reference thereto. Next, the technique related to the present invention will be analyzed.

However, based on the above conventional management method, when a mobile terminal conducts a handover from an access network using CMIP to a network using PMIP (as well as a handover in the reverse direction), there is a problem in that location of the mobile terminal cannot be registered to the HA based on an SA (Security Association). This is because, since nodes that register location of the mobile terminal are different between CMIP and PMIP, likewise, nodes that establish the HA and the SA differ between CMIP and PMIP.

Thus, it is an object of the present invention to solve the above problems by providing a mobility management system, a home agent, a mobile terminal management method used for them, and its program that can realize a handover between access methods using different mobility protocols, without changing the home agent providing the mobile terminal with mobility.

According to a first aspect of the present invention, there is provided a mobility management system managing mobility of any one mobile terminal with a different mobility protocol depending on an access method, and the mobility management system comprises an anchor node having a function of managing a CMIP (Client Mobile Internet Protocol) SA (Security Association) and a PMIP (Proxy MIP) SA used to authenticate a location registration message of the mobile terminal (claim 1). The anchor node used herein includes such mobility anchor that comprises HA and LMA functions.

According to a second aspect of the present invention, there is provided an anchor node used in a mobility management system managing mobility of any one mobile terminal with a different mobility protocol depending on an access method, and the anchor node comprises a function of managing a CMIP (Client Mobile Internet Protocol) SA (Security Association) and a PMIP (Proxy MIP) SA used to authenticate a location registration message of the mobile terminal (claim 11).

According to a third aspect of the present invention, there is provided a mobile terminal management method used in the mobility management system managing mobility of any one mobile terminal with a different mobility protocol depending on an access method, and, in the mobile terminal management method, an anchor node executes processing for managing a CMIP (Client Mobile Internet Protocol) SA (Security Association) and a PMIP (Proxy MIP) SA used to authenticate a location registration message of the mobile terminal (claim 21).

According to a fourth aspect of the present invention, there is provided a program executed by an anchor node used in the mobility management system managing mobility of any one mobile terminal with a different mobility protocol depending on an access method, and the program causes a computer to execute processing for managing a CMIP (Client Mobile Internet Protocol) SA (Security Association) and a PMIP (Proxy MIP) SA used to authenticate a location registration message of the mobile terminal (claim 31).

Namely, the above mobility management system manages mobility of any one mobile terminal with a different mobility protocol depending on an access method and also enables a handover between access systems (or methods) using different mobility protocols.

More specifically, in the above mobility management system, an anchor node having both HA (Home Agent) and LMA (Local Mobility Anchor) functions manages an MIP (Mobile Internet Protocol) SA (Security Association) and a PMIP (Proxy MIP) SA used to authenticate a location registration message of a mobile terminal.

CMIP (Client MIP) and PMIP have advantages and disadvantages regarding function deployment (or placement), security model of access network, effective utilization of resources, and the like. Thus, one idea for efficient mobility management is to selectively use two kinds of protocols (CMIP and PMIP) depending on the capability of the access network and manage mobility of any one (each) mobile terminal with a single HA. In this case, it is noted that the HA also has the LMA (Local Mobility Anchor) function, which is the HA for PMIP.

However, when a mobile terminal conducts a handover from an access network using CMIP to a network using PMIP (as well as a handover in the reverse direction), there is a problem in that authentication for location registration messages cannot be conducted with respect to the HA based on an SA.

The reason is as follows. Normally in MIP, the HA authenticates a message based on an SA established with a mobile terminal. However, in a situation assumed in the present invention, when a mobile terminal conducts a handover between an access network using CMIP and an access network using PMIP, since nodes that register location of the mobile terminal are different between CMIP and PMIP, nodes that establish the HA and the SA become likewise different between CMIP and PMIP. Thus, when a handover is conducted between an access network using CMIP and an access network using PMIP, location registration using message authentication cannot be conducted.

Therefore, in the present invention, an HA function receives a location registration message, selects an SA that needs to be used to authenticate the message, and authenticates the message. When registering a location to the HA function, a PMIP client function adds information indicating PMIP location registration to the location registration message.

In this way, in the mobility management system of the present invention, since the HA function manages the SA depending on a mobility protocol, a mobile terminal can conduct a handover between access systems (or methods) using different mobility protocols, without changing the HA providing the mobile terminal with mobility.

What is described in each of the dependent claims is embodied as an applicable mode of the present invention. Namely, original claims 2 to 10 (first aspect), original claims 12 to 20 (second aspect), and original claims 22 to 30 (third aspect) are possible to be realized. Disclosures of these individual dependent claims are incorporated herein by reference thereto. Regarding the program (fourth aspect), a program for the execution of processing corresponding to each of the above individual dependent claims can be embodied therein.

With the formulation and operation as described above, the present invention provides meritorious effects of realizing a handover between access systems (or methods) using different mobility protocols without changing a home agent providing the mobile terminal with mobility.

EXPLANATIONS OF SYMBOLS

Figure 1:
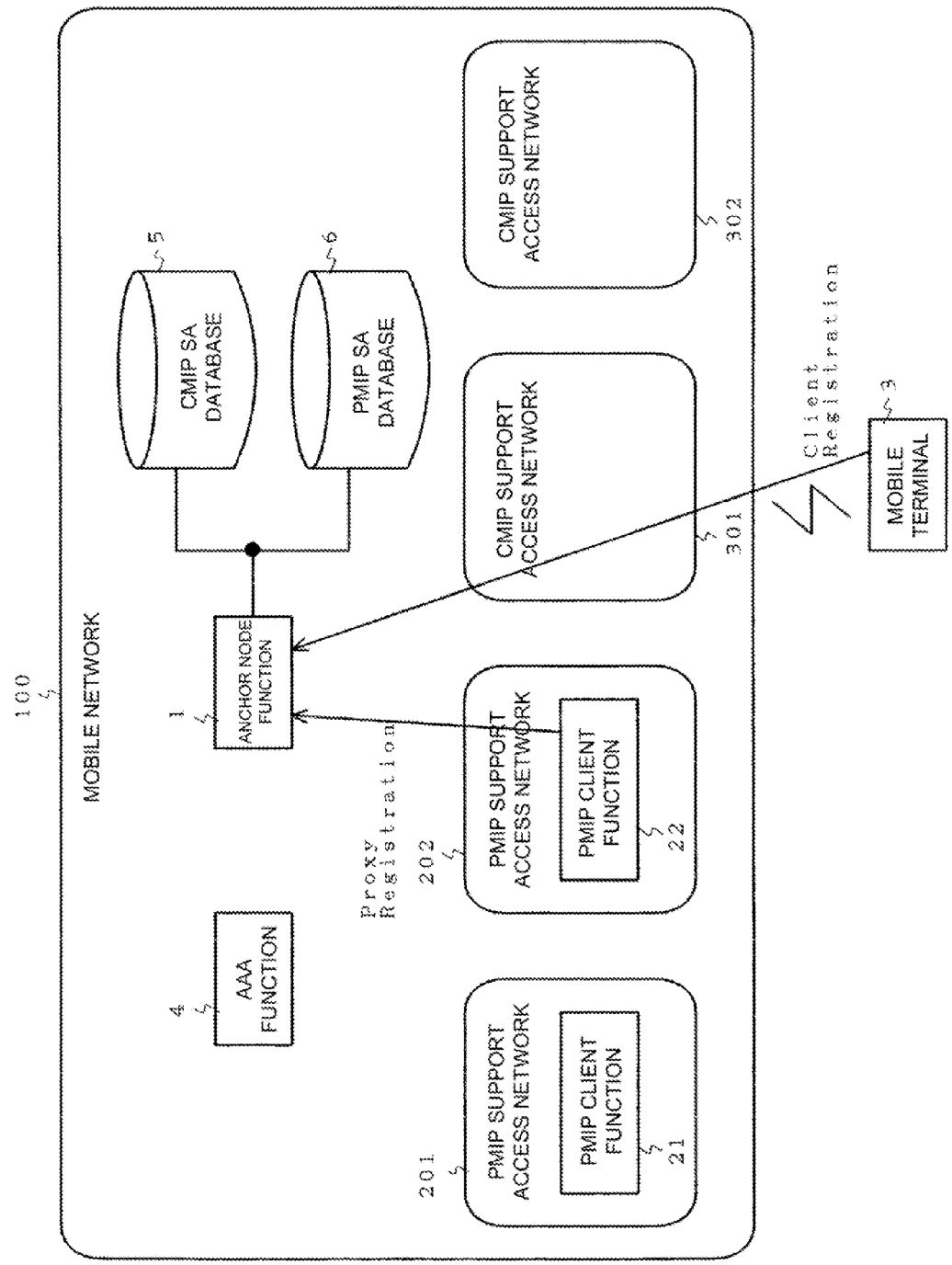
FIG. 1 shows a block diagram of a structure of a mobility management system according to a first exemplary embodiment of the present invention.

1 Anchor node function (unit)
3 Mobile terminal
4 AAA function (unit)
5 CMIP SA database
6, 6a PMIP SA database
11 PDN GW
14 AAA server
21, 22 PMIP client function (unit)
100 to 104 Mobile network
110 Information storage unit
111 Binding cache
112 CMIP SA database
113 PMIP SA database
114 Determination control unit
115 MIPv6 control processing unit
116 Authentication processing unit
117 Encapsulation processing unit
118 De-encapsulation processing unit
119 Routing processing unit
120 Interface unit
121, 122 Cellular network
131, 132 WiMAX network
141, 142 WLAN network
201, 202 PMIP support access network
211, 212 Serving GW
221, 222 ASN GW
231, 232 PDG
301, 302 CMIP support access network
400 Home network
501 to 504 Visited network (network in which Mobile Terminal exists)

PREFERRED MODES

Next, exemplary embodiments of the present invention will be described with reference to the drawings.

First Exemplary Embodiment

FIG. 1 shows a block diagram of a structure of a mobility management system according to a first exemplary embodiment of the present invention. In FIG. 1, the mobility management system according to the first exemplary embodiment of the present invention comprises a mobile terminal 3 and a mobile network 100. The mobile network 100 comprises; an anchor node function (unit) 1; an AAA (Authentication, Authorization and Accounting) function (unit) 4; PMIP (Proxy Mobile Internet Protocol) support access networks 201 and 202; and CMIP (Client MIP) support access networks 301 and 302.

The anchor node function 1 is an integrated anchor node supporting two kinds of mobility anchor functions, that is, the HA function of Mobile IPv6 (Client MIPv6; CMIP) described in RFC (Request For Comments) 3775 and the LMA function of Proxy Mobile IPv6 (PMIPv6). The anchor node function 1 comprises an IPsec (Internet Protocol security protocol) SA (Security Association) database (CMIP SA database (DB)) 5 used to authenticate a location registration message with CMIP and an IPsec SA database (PMIP SA database (DB)) 6 used to authenticate a location registration message with PMIP. The CMIP SA database 5 corresponds to a first storing means that stores at least one CMIP SA which is switchable to an identical HoA, used by the mobile terminal 3 for communication, and the PMIP SA database 6 corresponds to a second storing means that stores at least one PMIP SA switchable with respect to the above identical HoA.

An SA managed by the anchor node function 1 with CMIP is established relative to the anchor node function 1 for each HoA (Home Address: an IP address used by each mobile terminal 3 for communication) of the mobile terminals 3. In addition, an SA managed by the anchor node function 1 for PMIP is established relative to the anchor node function 1 for each HoA of the mobile terminals 3.

In the case of IPsec, the CMIP SA database 5 stores, under interrelation (association) between the following items, the IP address of the anchor node function 1, HoA(s) of the mobile terminal(s) 3, IPsec protocol type ESP (Encapsulating Security Payload) or AH (Authentication Header) (ESP is normally used in MIPv6), SA lifetime, encryption algorithm and key (only in the case of ESP), authentication algorithm and key, modes (tunnel or transport) (transport mode is normally used in MIPv6), the IP address of a tunnel endpoint (only in the tunnel mode), and the like.

In the case of IPsec, the PMIP SA database 6 stores, under interrelation between the following items, the IP address of the anchor node function 1, the IP address(es) of PMIP client(s) (when a PMIP SA is established for each PMIP client) (HoA(s) of the mobile terminal(s) 3 when a PMIP SA is established for each HoA, and a prefix belonging to a PMIP client within the visited network (network in which a mobile terminal exists) when a PMIP SA is established for each visited network), IPsec protocol type ESP (Encapsulating Security Payload) or AH (Authentication Header) (ESP is normally used in MIPv6), SA lifetime, encryption algorithm and key (only in the case of ESP), authentication algorithm and key, modes (tunnel or transport) (transport mode is normally used in MIPv6), the IP address of a tunnel endpoint (only in the tunnel mode), a PMIP SA establishment unit, and the like.

The PMIP support access networks 201 and 202 are access networks managing the mobile terminal(s) 3 with PMIP and comprise PMIP client functions 21 and 22, respectively. In FIG. 1, while only a single PMIP client function is shown in a single PMIP support access network, a plurality of PMIP client functions may be included in a single PMIP support access network.

The CMIP support access networks 301 and 302 are access networks managing the mobile terminal(s) 3 with CMIP. The AAA function 4 comprises information to authenticate terminals and PMIP messages.

Figure 2:
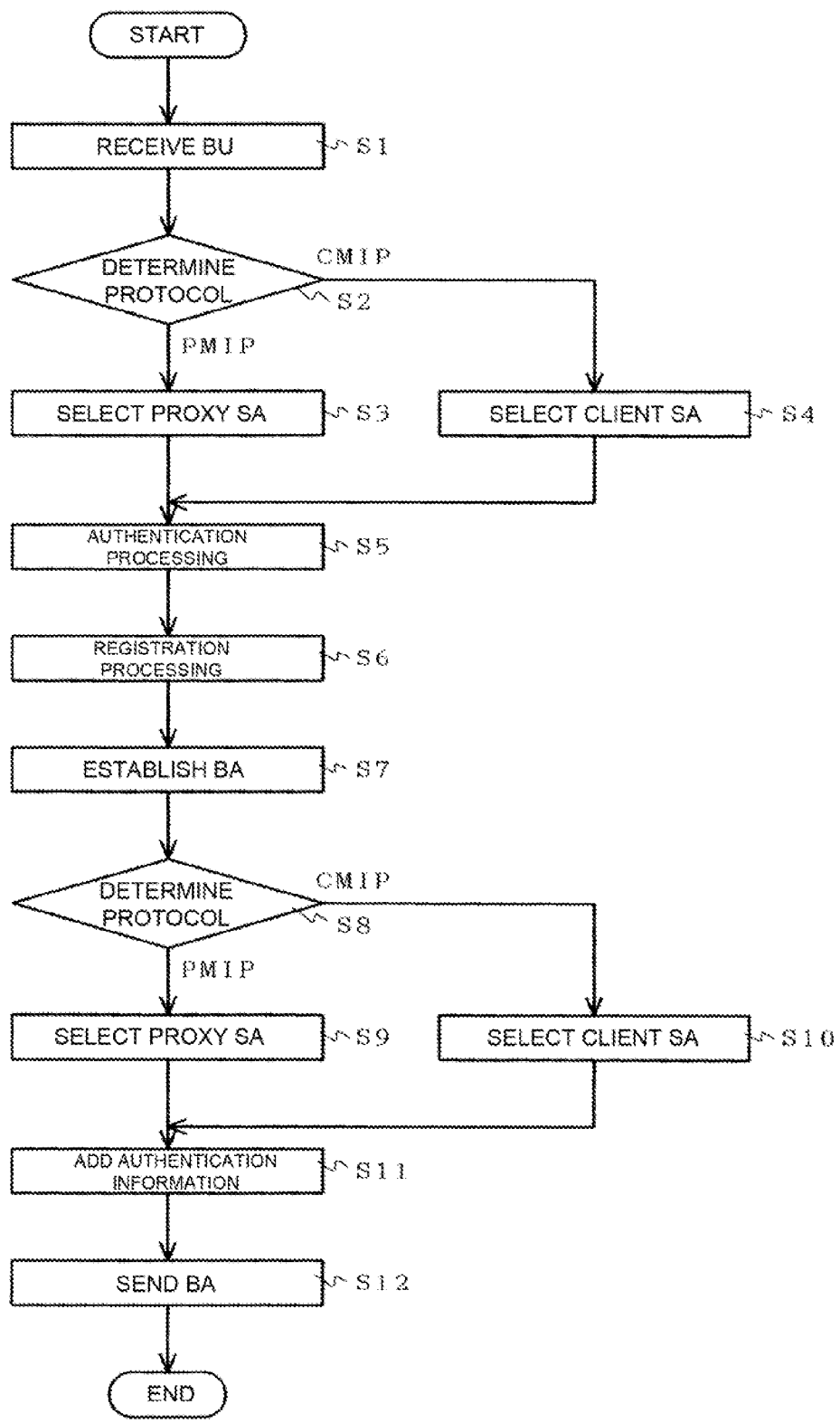
FIG. 2 shows a flow chart of an operation of location registration processing of an anchor node function of FIG. 1.

FIG. 2 shows a flow chart of an operation of location registration processing of the anchor node function 1 of FIG. 1. With reference to these FIGS. 1 and 2, an operation of location registration processing of the anchor node function 1 will be described. The operation of location registration processing shown in FIG. 2 is realized by causing a computer (not shown) realizing the anchor node function 1 to execute a program.

First, the anchor node function 1 receives a BU (Binding Update) as a location registration message of a mobile terminal 3 (step S1 in FIG. 2) and then determines whether the BU is a CMIP BU or a PMIP BU (step S2 in FIG. 2). The determination on the protocol can be made by the following methods:

(1) Whether or not PMIP information, which should be included in a PMIP BU, is included is determined. Examples of such PMIP information include a PMIP flag and a PMIP dedicated option. However, when a protocol having an encryption function for authentication such as IPsec is used, it is necessary to include PMIP information in a non-encryption portion so that the massage type can be determined even in an encrypted state (the option type number of a destination option header, for example).

(2) The SA DB related to the mobility protocol determined in the (1) is searched for an SA. If the result is determined to be a PMIP BU, the PMIP SA DB is searched based on a combination of the HoA and the mobility anchor node address included in the BU. If the BU is determined to be a CMIP BU, the CMIP SA DB is searched based on a combination of the HoA and the mobility anchor node address included in the BU.

When the BU received by the anchor node function 1 is a CMIP BU, the anchor node function 1 acquires a message-authentication IPsec SA from the CMIP SA database 5 by using the HoA of the mobile terminal 3 as a key (step S4 in FIG. 2). When the BU received by the anchor node function 1 is a PMIP BU, the anchor node function 1 acquires a message-authentication IPsec SA from the PMIP SA database 6 by using the HoA of the mobile terminal 3 as a key (step S3 in FIG. 2).

Thereafter, the anchor node function 1 uses the acquired IPsec SA and conducts authentication on the BU message with IPsec (step S5 in FIG. 2). After successful authentication on the message with IPsec, the anchor node function 1 executes registration processing (step S6 in FIG. 2).

Next, the anchor node function 1 establishes a BA (Binding Acknowledgement) as a location registration response (step S7 in FIG. 2), checks a mobility protocol currently managing the mobile terminal 3 (step S8 in FIG. 2), uses an IPsec SA corresponding to the protocol (steps S9 and S10 in FIG. 2), adds authentication information to the BA (step S11 in FIG. 2), and finally sends the BA (step S12 in FIG. 2).

Since the method for establishing a CMIP IPsec SA established between the anchor node function 1 and the mobile terminal(s) 3, the method for establishing a PMIP IPsec SA established between the anchor node function 1 and the PMIP client function 21 (or the PMIP client function 22) via the AAA function 4, the procedure for a handover between the PMIP support access networks 201 and 202, and the procedure for a handover between the CMIP support access networks 301 and 302 are known, the descriptions thereof are omitted herein.

In the first exemplary embodiment of the present invention, while IPsec is used as a message authentication means with both CMIP and PMIP, authentication utilizing an authentication option described in RFC 4285 may be used with both of CMIP and/PMIP/or any one of thereof alone.

Thus, in the first exemplary embodiment of the present invention, since the anchor node comprises a CMIP SA and a PMIP SA switchable with respect to one HoA, even in a mobility management system managing each mobile terminal depending on an access method, even when a handover is conducted between an access network using CMIP and an access network using PMIP, mobility services can be provided continuously with the same anchor node.

Second Exemplary Embodiment

A mobility management system according to a second exemplary embodiment of the present invention has a basic formulation similar to that of the mobility management system according to the first exemplary embodiment of the present invention shown in FIG. 1. However, the second exemplary embodiment differs from the first exemplary embodiment in that the PMIP IPsec SA is established between the anchor node function 1 and each of the PMIP client functions 21 and 22.

In the first exemplary embodiment of the present invention, while a PMIP SA is established for the HoA of the mobile terminal(s) 3, the anchor node function 1 establishes a PMIP IPsec SA for each of the PMIP client functions in the second exemplary embodiment of the present invention. Thus, in the second exemplary embodiment of the present invention, the IP address of each PMIP client function is used as a key to search the PMIP SA database 6 for a PMIP IPsec SA.

While IPsec is used as a message authentication means with both CMIP and PMIP in the second exemplary embodiment of the present invention, authentication utilizing an authentication option described in RFC 4285 may be used with CMIP and/or PMIP, i.e., both or either one alone.

Third Exemplary Embodiment

Figure 3:
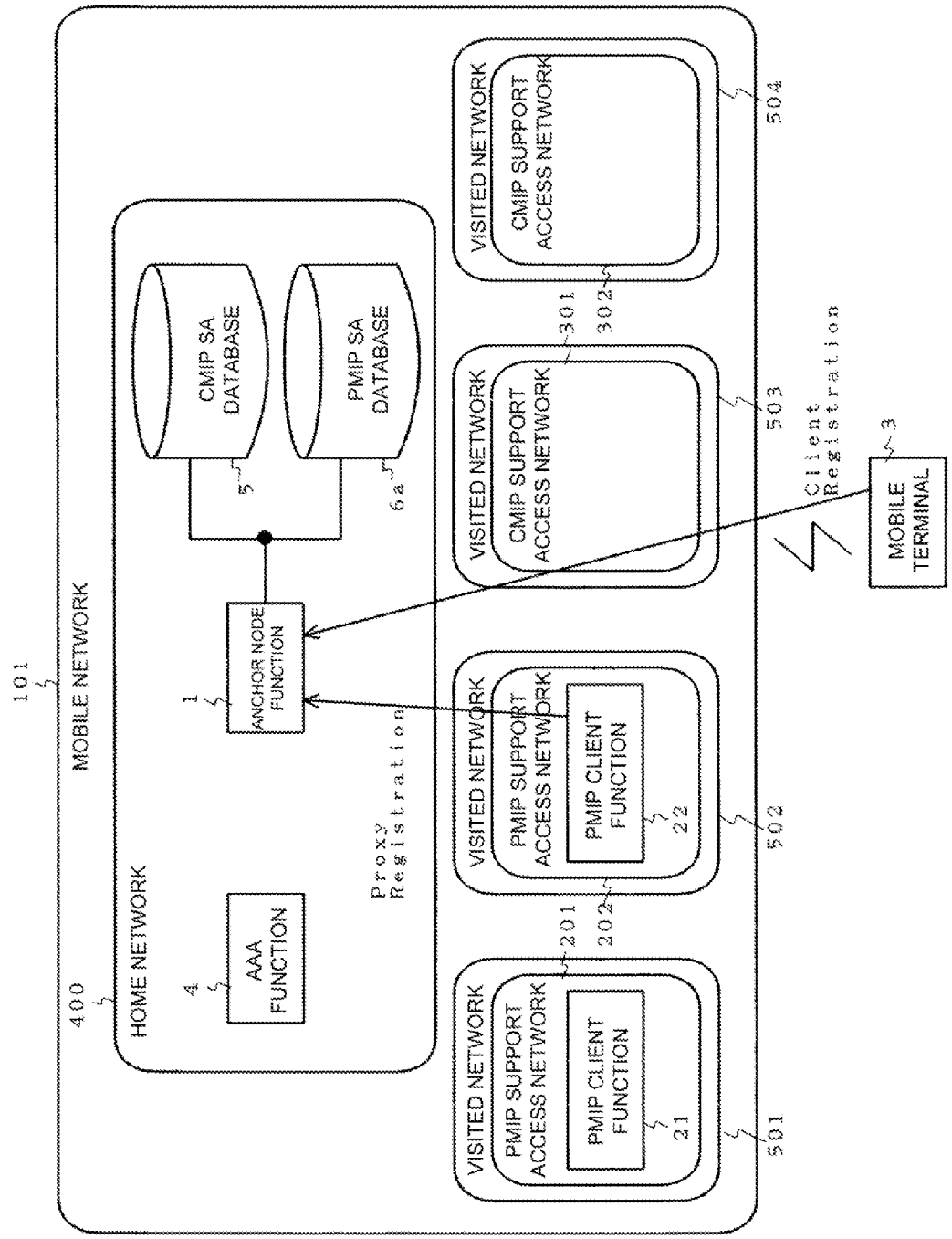
FIG. 3 shows a block diagram of a structure of a mobility management system according to a third exemplary embodiment of the present invention.

FIG. 3 shows a block diagram of a formulation of a mobility management system according to a third exemplary embodiment of the present invention. As shown in FIG. 3, the mobility management system according to the third exemplary embodiment of the present invention is different in that a PMIP IPsec SA is established between the anchor node function 1 and each of the PMIP client functions 21 and 22.

In FIG. 3, a mobile network 101 comprises a home network 400 and visited networks 501 to 504, and the home network 400 comprises the anchor node function 1 and the AAA function 4.

The visited networks 501 and 502 comprise the PMIP support access networks 201 and 202 having the PMIP client functions 21 and 22, respectively. In FIG. 3, while only a single PMIP support access network is shown in a single visited network, a plurality of PMIP support access networks may be included.

The visited networks 503 and 504 comprise the CMIP support access networks 301 and 302. In FIG. 3, while only a single CMIP support access network is shown in a single visited network, a plurality of CMIP support access networks may be included.

The anchor node function 1 is an integrated anchor node supporting two kinds of mobility protocols, that is, Mobile IPv6 (Client MIPv6; CMIP) described in RFC 3775 and Proxy Mobile IPv6 (PMIPv6), and the anchor node function 1 comprises the CMIP SA database 5 and an IPsec authentication SA database (PMIP SA database (DB)) 6a used to authenticate a location registration message with PMIP.

An SA managed by the anchor node function 1 with CMIP is established between the anchor node function 1 and the each HoA of the mobile terminal(s) 3. In addition, an SA managed by the anchor node function 1 with PMIP is established between the anchor node function 1 and each of the visited networks 501 to 504

The PMIP support access networks 201 and 202 are access networks managing the mobile terminal(s) 3 with PMIP and comprise the PMIP client functions 21 and 22, respectively. In FIG. 3, while only a single PMIP client function is shown in a single PMIP support access network, a plurality of PMIP client functions may be included.

The CMIP support access networks 301 and 302 are access networks managing the mobile terminal(s) 3 with CMIP. The AAA function 4 comprises information to authenticate terminal(s) and PMIP message(s).

In the third exemplary embodiment of the present invention, the anchor node function 1 establishes a PMIP SA for each visited network. Thus, in the third exemplary embodiment of the present invention, the IP address or NAI (Network Access Identifier) of each PMIP client function may be used as a key when searching the PMIP SA database 6a for a PMIP SA. In such case, the PMIP client functions 21 and 22 add the NAI thereof to a BU.

In the third exemplary embodiment of the present invention, while IPsec is used as a CMIP message authentication means, authentication using an authentication option described in RFC 4285 may be used. Further, while the above first to third exemplary embodiments of the present invention have been described based on MIPv6, the present invention is similarly applicable to either MIPv4 or MIPv6.

EXAMPLE 1

Figure 4:
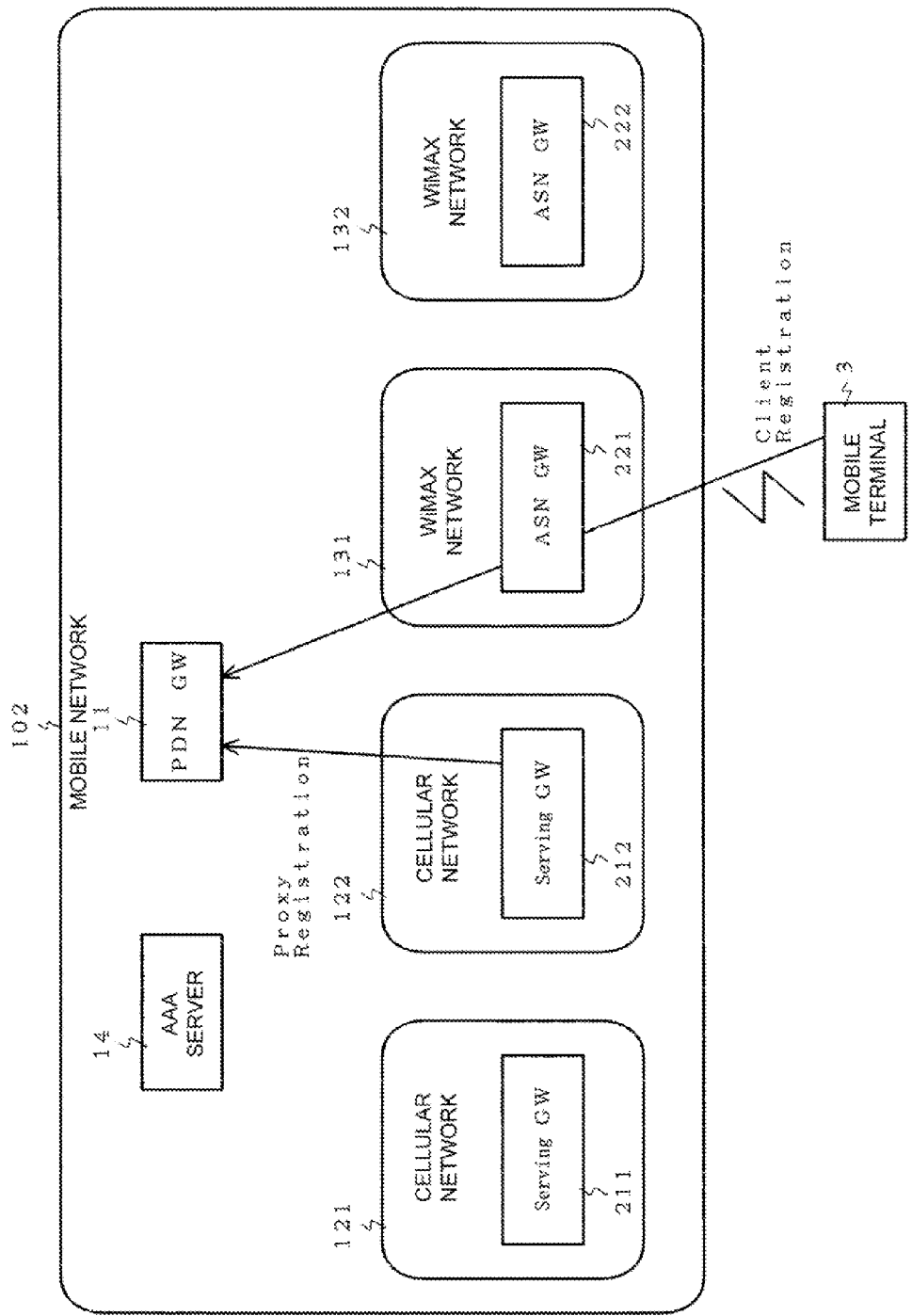
FIG. 4 shows a block diagram of a structure of a mobility management system according to a first example of the present invention.

FIG. 4 shows a block diagram of a formulation of a mobility management system according to a first example of the present invention. The mobility management system according to the first example of the present invention corresponds to the above first exemplary embodiment of the present invention.

In FIG. 4, a mobile network 102 comprises a PDN GW (Packet Data Network Gateway) 11, a AAA server 14, cellular networks 121 and 122, and WiMAX networks 131 and 132.

The PDN GW 11 is an integrated anchor node supporting two kinds of mobility protocols, that is, the HA function of Mobile IPv6 (Client MIPv6; CMIP) described in RFC 3775 and the LMA function of Proxy Mobile IPv6 (PMIPv6). The PDN GW 11 comprises the anchor node function 1, the CMIP SA database 5, and the PMIP SA database 6 shown in FIG. 1.

An IPsec SA managed by the PDN GW 11 with CMIP is established between the PDN GW 11 and each HoA of the mobile terminal(s) 3. Also, an IPsec SA managed by the PDN GW 11 with PMIP is established between the PDN GW 11 and each HoA of the mobile terminal(s) 3.

The cellular networks 121 and 122 are access networks managing the mobile terminals 3 with PMIP and comprise Serving GWs 211 and 212, respectively. In FIG. 4, while only a single Serving GW is shown in a single cellular network, a plurality of Serving GWs may be included in a single cellular network.

The Serving GWs 211 and 212 are anchor nodes within cellular networks in which the mobile terminals 3 move, such as an SGSN (Serving GPRS (General Packet Radio Service) Support Node). The Serving GWs 211 and 212 comprise the PMIP client functions 21 and 22 shown in FIG. 1.

The WiMAX networks 131 and 132 are access networks managing the mobile terminal(s) 3 with CMIP and comprise ASN (Access Server Node) GWs (GateWay) 221 and 222, respectively. In FIG. 4, while only a single ASN GW is shown in a single WiMAX network, a plurality of ASN GWs may be included in a single WiMAX network. Also, the AAA server 14 comprises information to authenticate terminal(s) and PMIP message(s).

In the example, while IPsec is used as a message authentication means both with CMIP and PMIP, authentication utilizing an authentication option described in RFC 4285 may be used with CMIP and/or PMIP.

Further, while the PDN GW 11 establishes a PMIP SA for each HoA of the mobile terminal(s) 3 in the example, as described in the above second and third exemplary embodiments of the present invention, a PMIP SA may be established for each Serving GW or for each visited network having the PMIP client function.

Furthermore, while MIPv6 is used as a mobility protocol in the example, MIPv4 may be used instead. Alternatively, both MIPv6 and MIPv4 may be used.

Figure 5:
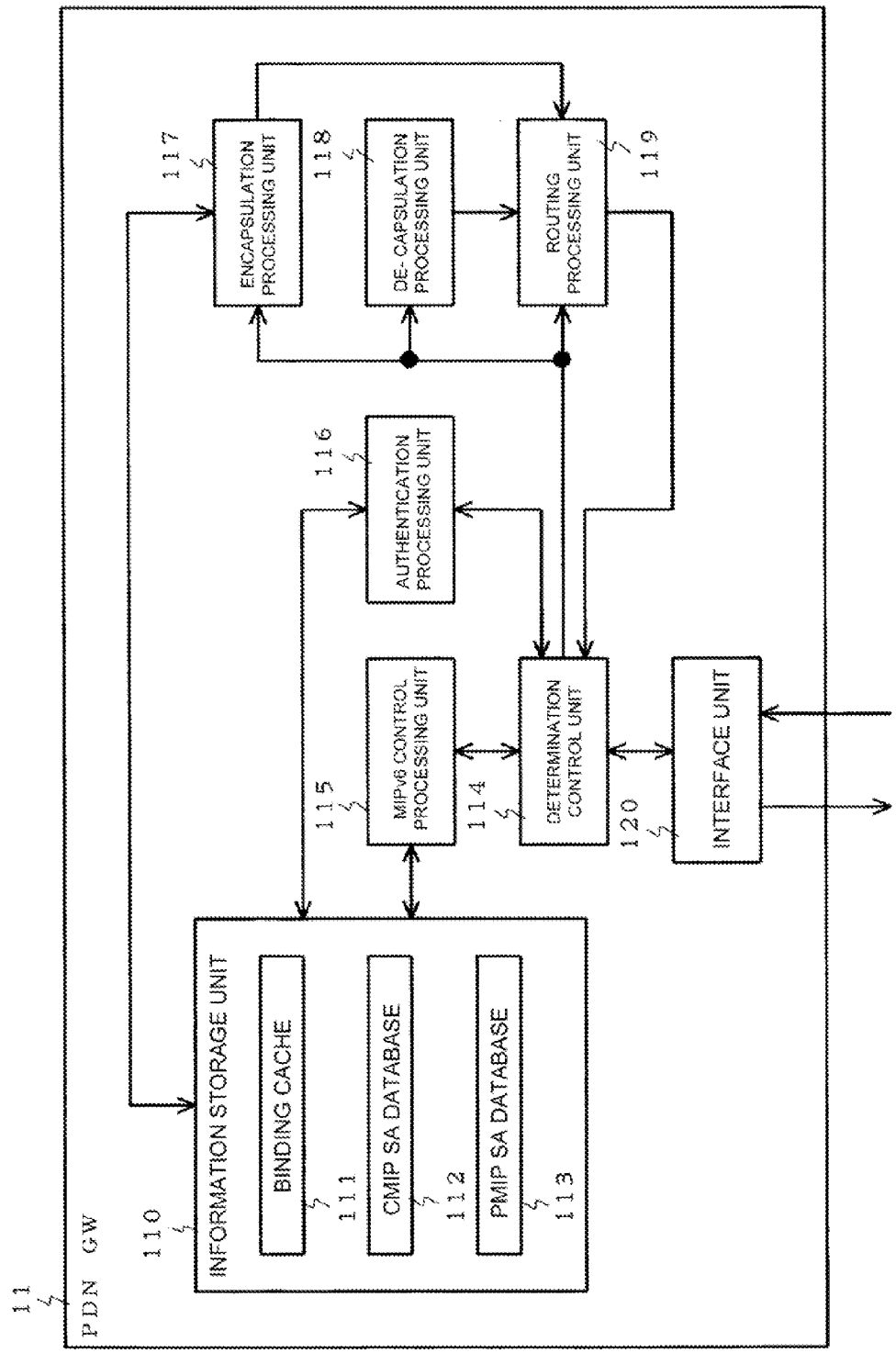
FIG. 5 shows a block diagram of an example of the structure of an anchor node of FIG. 4.

FIG. 5 shows a block diagram of an example of the formulation of the PDN GW 11 of FIG. 4. In FIG. 5, the PDN GW 11 comprises an information storage unit 110, a determination control unit 114, an MIPv6 control processing unit 115, an authentication processing unit 116, an encapsulation processing unit 117, a de-capsulation processing unit 118, a routing processing unit 119, and an interface unit 120.

The information storage unit 110 comprises a binding cache 111, a CMIP SA database 112, and a PMIP SA database 113. The binding cache 111 is a database for managing MN location information and comprises MN HoAs and CoAs, cache lifetime, and the like.

The CMIP SA database 112 is a database containing information necessary for authenticating CMIP signaling messages. When the authentication processing unit 116 determines that a message to be processed for authentication is a CMIP signaling, the authentication processing unit 116 searches the CMIP SA database 112. The CMIP SA database 112 accumulates similar information as the above CMIP SA database 5.

The PMIP SA database 113 is a database containing necessary information for authenticating PMIP signaling messages. When the authentication processing unit 116 determines that a message to be processed for authentication is a PMIP signaling, the authentication processing unit 116 searches the PMIP SA database 113. The PMIP SA database 113 accumulates similar information as the above PMIP SA database 6.

The determination control unit 114 sends a received packet to a necessary subsequent processing. The MIPv6 control processing unit 115 processes signaling of MIPv6 and PMIPv6. Specifically, the MIPv6 control processing unit 115 extracts, for example, the HoA, CoA or the like of an MN from a received BU and registers the data in the binding cache 111. Thereafter, the MIPv6 control processing unit 115 creates a BA to be sent back to the MN and sends the BA to the determination control unit 114.

The authentication processing unit 116 uses IPsec or an authentication option described in RFC 4285 and then authenticates a BU or BA message. When conducting authentication, the authentication processing unit 116 refers to a corresponding database depending on the type of the BU or BA message (CMIP or PMIP).

The encapsulation processing unit 117 encapsulates an IP packet. The PDN GW 11 causes this encapsulation processing unit 117 to encapsulate an IP packet addressed to the HoA of an MN, so that the packet is addressed to the CoA of the MN.

The de-encapsulation processing unit 118 de-encapsulates an IP packet. The PDN GW 11 causes this de-encapsulation processing unit 118 to de-encapsulate the encapsulated IP packet sent from an MN (destination IP address is the IP address of the PDN GW 11), and extracts the IP packet therein (source IP address is the HoA of the MN).

The routing processing unit 119 has a function of recognizing the destination IP address of the received IP packet and forwarding the IP packet to an appropriate forwarding address. The interface unit 120 is connected to an external network to conduct processing in layers lower than the IP layer.

Thus, in the example, since the PDN GW 11 comprises a CMIP SA and a PMIP SA switchable with respect to an identical HoA, even in a mobility management system managing any one mobile terminal 3 depending on an access method, even when a handover is conducted between an access network using CMIP and an access network using PMIP, mobility services can be provided continuously with the same PDN GW 11.

EXAMPLE 2

Figure 6:
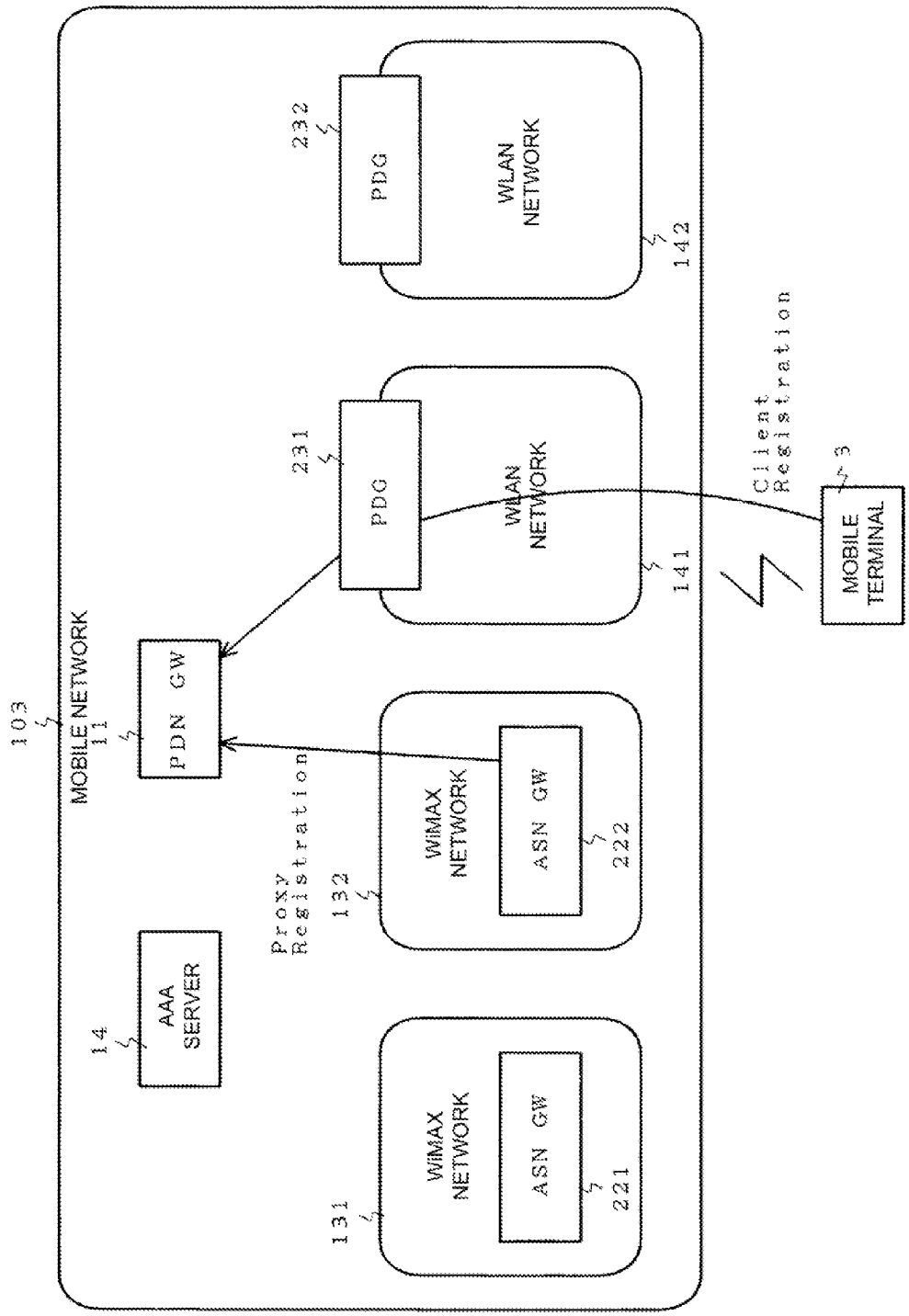
FIG. 6 shows a block diagram of a structure of a mobility management system according to a second example of the present invention.

FIG. 6 shows a block diagram of a formulation of a mobility management system according to a second example of the present invention. The mobility management system according to the second example of the present invention also corresponds to the above first exemplary embodiment of the present invention.

In FIG. 6, a mobile network 103 comprises the PDN GW 11, the AAA server 14, the WiMAX networks 131 and 132, and WLAN (Wireless Local Area Network) networks 141 and 142.

The PDN GW 11 is an integrated anchor node supporting two kinds of mobility protocols, that is, Mobile IPv6 (Client MIPv6; CMIP) described in RFC 3775 and Proxy Mobile IPv6 (PMIPv6). The PDN GW 11 comprises the anchor node function 1, the CMIP SA database 5, and the PMIP SA database 6 shown in FIG. 1. Namely, the PDN GW 11 has the same structure as the above PDN GW 11 shown in FIG. 5.

An IPsec SA managed by the PDN GW 11 with CMIP is established between the PDN GW 11 and the HoA of each of the mobile terminals 3. Also, an IPsec SA managed by the PDN GW 11 with PMIP is established between the PDN GW 11 and the HoA of each of the mobile terminal 3.

The WiMAX networks 131 and 132 are access networks managing the mobile terminals 3 with PMIP and comprise the ASN GWs 221 and 222, respectively. In FIG. 6, while only a single ASN GW is shown in a single WiMAX network, a plurality of ASN GWs may be included in a single WiMAX network.

The ASN GWs 221 and 222 are core edge nodes for the mobile terminals 3 moving in the WiMAX networks 131 and 132 and comprises the PMIP client functions 21 and 22 shown in FIG. 1.

The WLAN networks 141 and 142 are access networks managing the mobile terminals 3 with CMIP, and the AAA server 14 comprises information to authenticate terminals and PMIP messages.

In the example, while IPsec is used as a message authentication means both with CMIP and PMIP, authentication utilizing an authentication option described in RFC 4285 may be used with CMIP and/or PMIP.

Further, while the PDN GW 11 establishes a PMIP SA for each HoA of the mobile terminal(s) 3 in the example, as described in the above second and third exemplary embodiments of the present invention, a PMIP SA may be established for each ASN GW or for each visited network having the PMIP client function. Furthermore, while MIPv6 is used as a mobility protocol in the example, MIPv4 may be used instead. Alternatively, both MIPv6 and MIPv4 may be used.

Thus, in the present example, since the PDN GW 11 comprises a CMIP SA and a PMIP SA switchable with respect to an identical HoA, even in a mobility management system managing any one mobile terminal 3 depending on an access method, even when a handover is conducted between an access network using CMIP and an access network using PMIP, mobility services can be provided continuously with the same PDN GW 11.

EXAMPLE 3

Figure 7:
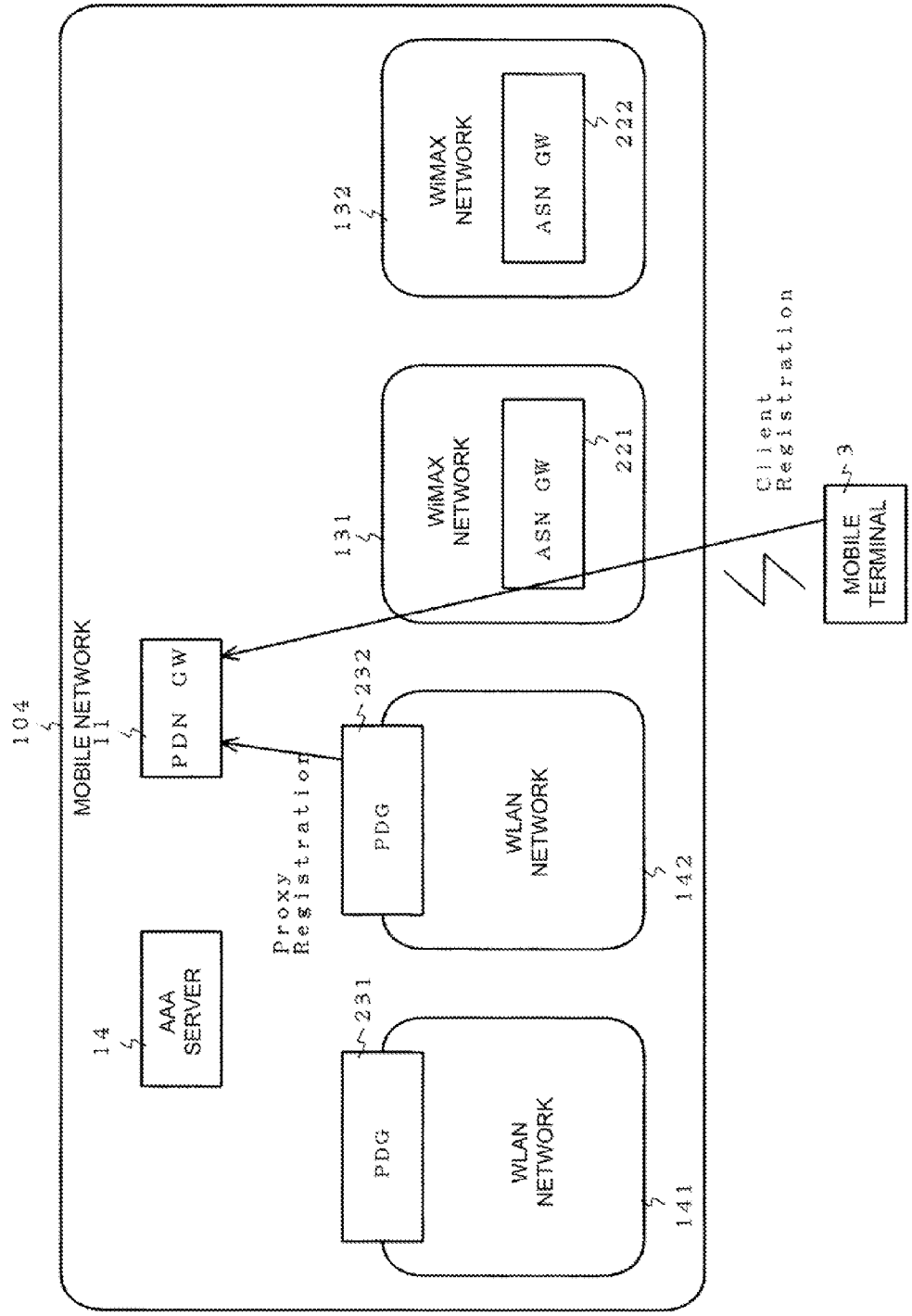
FIG. 7 shows a block diagram of a structure of a mobility management system according to a third example of the present invention.
Figure 8:
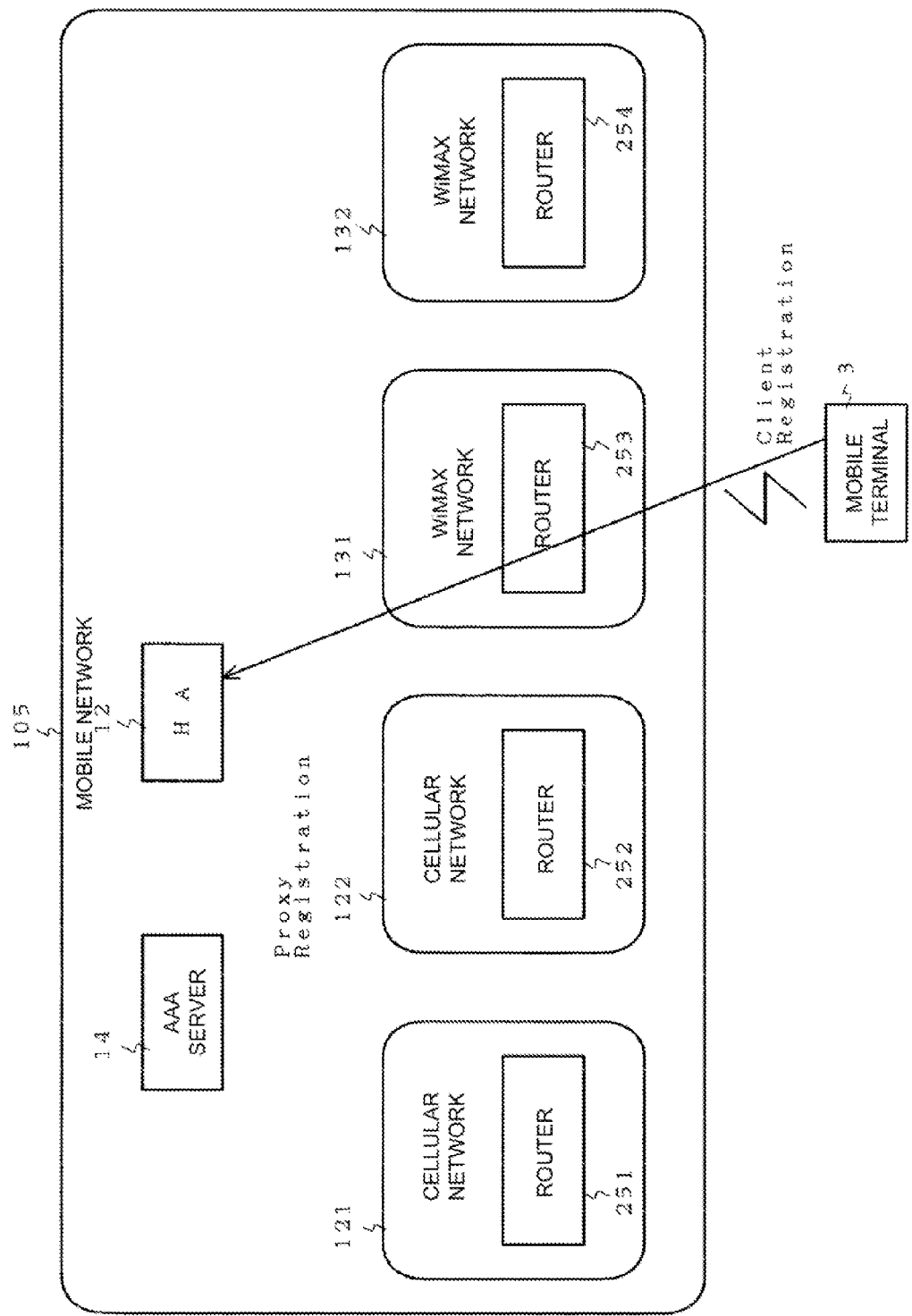
FIG. 8 shows a block diagram of a structure of a conventional example of the mobility management system.

FIG. 7 shows a block diagram of a formulation of a mobility management system according to a third example of the present invention. The mobility management system according to the third example of the present invention also corresponds to the above first exemplary embodiment of the present invention.

In FIG. 7, a mobile network 104 comprises the PDN GW 11, the AAA server 14, the WiMAX networks 131 and 132, and the WLAN networks 141 and 142.

The PDN GW 11 is an integrated anchor node supporting two kinds of mobility protocols, that is, the HA function of Mobile IPv6 (Client MIPv6; CMIP) described in RFC 3775 and the LMA function of Proxy Mobile IPv6 (PMIPv6). The PDN GW 11 comprises the anchor node function 1, the CMIP SA database 5, and the PMIP SA database 6 shown in FIG. 1. Namely, the PDN GW 11 has the same structure as the above PDN GW 11 shown in FIG. 5.

An IPsec SA managed by the PDN GW 11 with CMIP is established between the PDN GW 11 and each HoA of the mobile terminal(s) 3. Also, an IPsec SA managed by the PDN GW 11 with PMIP is established between the PDN GW 11 and each HoA of the mobile terminal(s) 3.

The WLAN networks 141 and 142 are access networks managing the mobile terminals 3 with PMIP and comprise the PDGs (Packet Data Gateway) 231 and 232, respectively. In FIG. 7, while only a single PDG is shown in a single WLAN network, a plurality of PDGs may be included in a single WLAN network.

The PDGs 231 and 232 are nodes establishing secure tunnels using IPsec with the mobile terminals 3 moving within the WLAN networks 141 and 142 and comprise the PMIP client functions 21 and 22 shown in FIG. 1.

The WiMAX networks 131 and 132 are access networks managing the mobile terminals 3 with CMIP. The AAA server 14 comprises information to authenticate terminal(s) and PMIP message(s).

In the example, while IPsec is used as a message authentication means with both CMIP and PMIP, an authentication option described in RFC 4285 may be used with CMIP and/or PMIP.

Further, while the PDN GW 11 establishes a PMIP SA for each HoA of the mobile terminal(s) 3 in the example, as described in the above second and third exemplary embodiments of the present invention, a PMIP SA may be established for each ASN GW or for each visited network having the PMIP client function. In addition, while MIPv6 is used as a mobility protocol in the example, MIPv4 may be used instead. Alternatively, both MIPv6 and MIPv4 may be used.

Thus, in the present example, since the PDN GW 11 comprises a CMIP SA and a PMIP SA switchable with respect to any one HoA, even in a mobility management system managing any one mobile terminal 3 depending on an access method, even when a handover is conducted between an access network using CMIP and an access network using PMIP, mobility services can be provided continuously with the same PDN GW 11.

In the framework of full disclosure of the present invention (including the claims), and based on its basic technological idea, exemplary embodiments or examples of the present invention may be changed and/or adjusted. In addition, in the framework of the claims of the present invention, different combinations or selections of various elements disclosed herein are possible.

In the present invention, various modes are possible as follows.

Modes 1-19 are as set forth in claims 1-19.
Mode 20:
The anchor node according to any one of modes 11 to 19, wherein an IPsec-(Internet Protocol security protocol) based authentication method is used to authenticate the location registration message of the both mobility protocol.
Mode 21:
A mobile terminal management method used in a mobility management system managing mobility of any one mobile terminal with a different mobility protocol depending on an access method, wherein an anchor node executes processing for managing a CMIP (Client Mobile Internet Protocol) SA (Security Association) and a PMIP (Proxy MIP) SA used to authenticate a location registration message of said mobile terminal.
Mode 22:
The mobile terminal management method according to mode 21, wherein the anchor node executes processing for determining a protocol type with information in an unencrypted portion of a BU (Binding Update) which is a location registration message of the mobile terminal.
Mode 23:
The mobile terminal management method according to mode 21 or 22, wherein the mobility management system comprises a first access network using CMIP and a second access network using PMIP.
Mode 24:
The mobile terminal management method according to any one of modes 21 to 23, wherein the anchor node manages a CMIP SA and a PMIP SA switchable to one another for one HoA used by said mobile terminal for communication.
Mode 25:
The mobile terminal management method according to mode 24, wherein the anchor node establishes the PMIP SA for each HoA of the mobile terminal(s).
Mode 26:
The mobile terminal management method according to mode 24, wherein the anchor node establishes the PMIP SA for each PMIP Client.

Mode 27:
The mobile terminal management method according to mode 24, wherein the anchor node establishes the PMIP SA for each visited network.

Mode 28:
The mobile terminal management method according to mode 25, wherein the anchor node uses a different PMIP SA for each visited network.

Mode 29:
The mobile terminal management method according to any one of modes 21 to 28, wherein MIPv6 (Mobile Internet Protocol version 6) is used as the both mobility protocol.

Mode 30:
The mobile terminal management method according to any one of modes 21 to 29, wherein an IPsec-(Internet Protocol security protocol) based authentication method is used to authenticate the location registration message of the both mobility protocol.

Mode 31 is as set forth in claim 31.

Mode 32:
The mobility management system according to any one of modes 1 to 8, wherein MIPv4 (Mobile Internet Protocol version 4) is used as the both mobility protocol.

Mode 33:
The mobility management system according to any one of modes 1 to 8, wherein MIPv6 (Mobile Internet Protocol version 6) is used as one of the mobility protocol and MIPv4 (Mobile Internet Protocol version 4) is used as the other mobility protocol.

Mode 34:
The mobility management system according to any one of modes 1 to 9, wherein an authenticator-based authentication method is used to authenticate the location registration message of the both mobility protocol.

Mode 35:
The mobility management system according to any one of modes 1 to 9, wherein an IPsec-(Internet Protocol security protocol) based authentication method is used to authenticate the location registration message of one of the mobility protocol and an authenticator-based authentication method is used to authenticate the location registration message of the other mobility protocol.

Mode 36:
The anchor node according to any one of modes 11 to 18, wherein MIPv4 (Mobile Internet Protocol version 4) is used as the both mobility protocol.

Mode 37:
The anchor node according to any one of modes 11 to 18, wherein MIPv6 (Mobile Internet Protocol version 6) is used as one of the mobility protocol and MIPv4 (Mobile Internet Protocol version 4) is used as the other mobility protocol.

Mode 38:
The anchor node according to any one of modes 11 to 19, wherein an authenticator-based authentication method is used to authenticate the location registration message of the both mobility protocol.

Mode 39:
The anchor node according to any one of modes 11 to 19, wherein an IPsec-(Internet Protocol security protocol) based authentication method is used to authenticate the location registration message of one of the mobility protocol and an authenticator-based authentication method is used to authenticate the location registration message of the other mobility protocol.

Mode 40:
The mobile terminal management method according to any one of modes 21 to 28, wherein MIPv4 (Mobile Internet Protocol version 4) is used as the both mobility protocol.

Mode 41:
The mobile terminal management method according to any one of modes 21 to 28, wherein MIPv6 (Mobile Internet Protocol version 6) is used as one of the mobility protocol and MIPv4 (Mobile Internet Protocol version 4) is used as the other mobility protocol.

Mode 42:
The mobile terminal management method according to any one of modes 21 to 29, wherein an authenticator-based authentication method is used to authenticate the location registration message of the both mobility protocol.

Mode 43:
The mobile terminal management method according to any one of modes 21 to 29, wherein an IPsec-(Internet Protocol security protocol) based authentication method is used to authenticate the location registration message of one of the mobility protocol and an authenticator-based authentication method is used to authenticate the location registration message of the other mobility protocol.

What is claimed is:

1. A mobility management system managing mobility of any one mobile terminal with a different mobility protocol depending on an access method, the system comprising an anchor node having a function of managing a CMIP (Client Mobile Internet Protocol) SA (Security Association) and a PMIP (Proxy MIP) SA used to authenticate a location registration message of said mobile terminal.

2. The mobility management system according to claim 1, wherein said anchor node comprises a function of determining a protocol type with information in an unencrypted portion of a BU (Binding Update) which is a location registration message of said mobile terminal.

3. The mobility management system according to claim 1, comprising a first access network using CMIP and a second access network using PMIP.

4. The mobility management system according to claim 1, wherein said anchor node comprises:
a storing unit that stores a CMIP SA and a PMIP SA switchable to one another for one HoA used by said mobile terminal for communication.

5. The mobility management system according to claim 4, wherein said anchor node establishes the PMIP SA for each HoA of said mobile terminal(s).

6. The mobility management system according to claim 5, wherein the anchor node uses a different PMIP SA for each visited network.

7. The mobility management system according to claim 4, wherein the anchor node establishes the PMIP SA for each PMIP Client.

8. The mobility management system according to claim 4, wherein the anchor node establishes the PMIP SA for each visited network.

9. The mobility management system according to claim 1, wherein MIPv6 (Mobile Internet Protocol version 6) is used as both of the mobility protocols.

10. The mobility management system according to claim 1, wherein an IPsec-(Internet Protocol security protocol) based authentication method is used to authenticate the location registration message of both of the mobility protocols.

11. The mobility management system according to claim 1, wherein an authenticator-based authentication method is used to authenticate the location registration message of both of the mobility protocols.

12. The mobility management system according to claim 1, wherein an IPsec-(Internet Protocol security protocol) based authentication method is used to authenticate the location registration message of one mobility protocol and an authenticator-based authentication method is used to authenticate the location registration message of another mobility protocol.

13. An anchor node used in a mobility management system managing mobility of each mobile terminal with a different mobility protocol depending on an access method,
said anchor node comprising:
a function of managing a CMIP (Client Mobile Internet Protocol) SA (Security Association) and a PMIP (Proxy MIP) SA used to authenticate a location registration message of the mobile terminal.

14. The anchor node according to claim 13, comprising a function of determining a protocol type with information in an unencrypted portion of a BU (Binding Update) which is a location registration message of the mobile terminal.

15. The anchor node according to claim 13, wherein the mobility management system comprises a first access network using CMIP and a second access network using PMIP.

16. The anchor node according to claim 13, comprising:
a storing unit that stores a CMIP SA and a PMIP SA switchable to one another for one HoA used by said mobile terminal for communication.

17. The anchor node according to claim 16, wherein the PMIP SA is established for each HoA of the mobile terminal(s).

18. The anchor node according to claim 17, wherein a different PMIP SA is used for each visited network.

19. The anchor node according to claim 16, wherein the PMIP SA is established for each PMIP Client.

20. The anchor node according to claim 16, wherein the PMIP SA is established for each visited network.

21. The anchor node according to claim 13, wherein MIPv6 (Mobile Internet Protocol version 6) is used as both of the mobility protocols.

22. The anchor node according to claim 13, wherein an IPsec-(Internet Protocol security protocol) based authentication method is used to authenticate the location registration message of both of the mobility protocols.

23. The anchor node according to claim 13, wherein MIPv4 (Mobile Internet Protocol version 4) is used as both of the mobility protocols.

24. The anchor node according to claim 13, wherein MIPv6 (Mobile Internet Protocol version 6) is used as one mobility protocol and MIPv4 (Mobile Internet Protocol version 4) is used as another mobility protocol.

25. The anchor node according to claim 13, wherein an authenticator-based authentication method is used to authenticate the location registration message of both of the mobility protocols.

26. The anchor node according to claim 13, wherein an IPsec-(Internet Protocol security protocol) based authentication method is used to authenticate the location registration message of one mobility protocol and an authenticator-based authentication method is used to authenticate the location registration message of another mobility protocol.

27. A mobile terminal management method used in a mobility management system managing mobility of any one mobile terminal with a different mobility protocol depending on an access method, wherein an anchor node executes processing for managing a CMIP (Client Mobile Internet Protocol) SA (Security Association) and a PMIP (Proxy MIP) SA used to authenticate a location registration message of said mobile terminal.

28. The mobile terminal management method according to claim 27, wherein the anchor node executes processing for determining a protocol type with information in an unencrypted portion of a BU (Binding Update) which is a location registration message of the mobile terminal.

29. The mobile terminal management method according to claim 27, wherein the mobility management system comprises a first access network using CMIP and a second access network using PMIP.

30. The mobile terminal management method according to claim 27, wherein the anchor node manages a CMIP SA and a PMIP SA switchable to one another for one HoA used by said mobile terminal for communication.

31. The mobile terminal management method according to claim 30, wherein the anchor node establishes the PMIP SA for each HoA of the mobile terminal(s).

32. The mobile terminal management method according to claim 30, wherein the anchor node establishes the PMIP SA for each PMIP Client.

33. The mobile terminal management method according to claim 31, wherein the anchor node uses a different PMIP SA for each visited network.

34. The mobile terminal management method according to claim 30, wherein the anchor node establishes the PMIP SA for each visited network.

35. The mobile terminal management method according to claim 27, wherein MIPv6 (Mobile Internet Protocol version 6) is used as both of the mobility protocols.

36. The mobile terminal management method according to claim 27, wherein an IPsec-(Internet Protocol security protocol) based authentication method is used to authenticate the location registration message of both of the mobility protocols.

37. The mobile terminal management method according to claim 27, wherein MIPv4 (Mobile Internet Protocol version 4) is used as both of the mobility protocols.

38. The mobile terminal management method according to claim 27, wherein MIPv6 (Mobile Internet Protocol version 6) is used as mobility protocol and MIPv4 (Mobile Internet Protocol version 4) is used as another mobility protocol.

39. The mobile terminal management method according to claim 27, wherein an authenticator-based authentication method is used to authenticate the location registration message of both of the mobility protocols.

40. The mobile terminal management method according to claim 27, wherein an IPsec-(Internet Protocol security protocol) based authentication method is used to authenticate the location registration message of one mobility protocol and an authenticator-based authentication method is used to authenticate the location registration message of another mobility protocol.

41. A non-transitory computer-readable storage medium storing a program executed by an anchor node used in a mobility management system managing mobility of any one mobile terminal with different mobility protocols depending on an access method, the program causing a computer to execute processing for managing a CMIP (Client Mobile Internet Protocol) SA (Security Association) and a PMIP (Proxy MIP) SA used to authenticate a location registration message of said mobile terminal.

42. The mobility management system according to claim 1, wherein MIPv4 (Mobile Internet Protocol version 4) is used as both of the mobility protocols.

43. The mobility management system according to claim 1, wherein MIPv6 (Mobile Internet Protocol version 6) is used as one mobility protocol and MIPv4 (Mobile Internet Protocol version 4) is used as another mobility protocol.

* * * * *